United States Patent [19]

Thompson et al.

[11] Patent Number: 5,204,826

[45] Date of Patent: Apr. 20, 1993

[54] QUALITY ASSURANCE OF SURFACE TREATMENTS BY ANALYSIS OF SUBSTRATE SURFACE LINE TRACES

[75] Inventors: Robert A. Thompson, Quaker Street; Trent J. Markell, Delanson, both of N.Y.

[73] Assignee: General Electric Company, Schenectady, N.Y.

[21] Appl. No.: 650,828

[22] Filed: Feb. 1, 1991

[51] Int. Cl.$^5$ .............................................. B24C 1/10
[52] U.S. Cl. ....................................... 364/552; 72/53; 364/560
[58] Field of Search .................... 364/551.01, 552, 508, 364/474.36, 474.37, 560, 561; 72/53

[56] References Cited

U.S. PATENT DOCUMENTS

| | | | |
|---|---|---|---|
| 4,514,469 | 4/1985 | Loersch et al. | 72/53 |
| 4,805,429 | 2/1989 | Thompson | 72/53 |
| 5,003,805 | 4/1991 | Thompson | 72/53 |

Primary Examiner—Parshotam S. Lall
Assistant Examiner—Michael Zanelli
Attorney, Agent, or Firm—James R. McDaniel; Paul R. Webb, II.

[57] ABSTRACT

A quality assurance of surface treatments, typically with shot peening, by analysis of substrate surface line traces is disclosed. In particular, line traces are created over the surface treated substrate. These line traces are filtered with a low pass filter to create relative maximums. The coordinates of the relative maximums are determined and the spatial distance between these coordinates are measured and recorded. The actual plastic upset depth of the surface treatment substrate is determined. The surface treatment is then adjusted, if necessary, based upon the values of these spatial distances and actual plastic upset depths.

5 Claims, 14 Drawing Sheets

QUALITY ASSURANCE OF SURFACE TREATMENTS BY ANALYSIS OF SUBSTRATE SURFACE LINE TRACES

BACKGROUND OF THE INVENTION

This invention relates to quality assurance systems for surface treatment of a substrate surface of the type that measure the surface compressive layer depth or intensity of a surface treated substrate. such systems of this type generally provide the surface compressive layer depth measure directly and substantially without destructing the substrate. In particular, a substrate surface which has been surface treated, typically, by conventional shot peening techniques is evaluated by automated analysis of digitally recorded topographical line scans. The method involves computer analysis of the digitized line data to determine, typically, the diameter of the dimples generated by the shot impact. Since the depth of the plastically upset or compressive layer due to the shot peening roughly equals the dimple diameter, this method should substantially provide a direct measure of intensity. This invention relates to certain unique surface treatment analyzers and the evaluating means in association therewith.

During a shot peening process, a stream of shot (i.e., particles), travelling at a high velocity, is directed at a workpiece surface. The shot is directed at the workpiece so as to cause plastic deformation of the workpiece surface, which often is a metal surface. Although the process may be applied for other purposes, the shot peening process generally is used to increase fatigue strength of the workpiece.

For example, residual stress near the surface of high performance machine parts is directly related to the fatigue life of the part. If the surface is in a state of residual compression, the growth of microcracks created by, for example, hard processing, should be inhibited. Shot peening is, typically, a very effective means for producing surface compression residual stress, and therefore, prolonging the useful life of the part.

Determining the state of surface compression due to shot peening, however, has proven to be very difficult. There are currently several methods used to measure surface compression. In particular, there is a direct method for determining surface compression due to shot peening. Under this direct method the workpiece is cut by conventional cutting techniques, and then the depth, i.e. thickness, of the surface compression is physically measured. This direct method is time consuming and requires destructing the part being analyzed. A more advantageous system, then, would be presented if such amounts of time and destruction were reduced.

Another known method for determining surface compression due to shot peening which is less time consuming and avoids the destruction of the workpiece is referred to as an indirect Almen method. In the Almen method, a strip of material is shot peened, and then the strip is analyzed to determine the surface compression due to the shot peening. The Almen method is indirect in that the effects of shot peening are not measured directly from a workpiece, rather a substitute, namely, an Almen strip is utilized. However, the Almen strip method is subject to insensitivity due to process changes which may occur in the peening operations between Almen strip checks. Also, when peening workpieces having contoured surfaces, it is difficult to reproduce the peening conditions on the contour surfaces with an Almen strip which is usually flat. Further, variations in the Almen strips themselves render the Almen strip method subject to error. Consequently, a still more advantageous system would be presented if such amounts of insensitivity, inapplicability and variation could be reduced while still avoiding the destruction of the workpiece.

Finally, there has been developed a method and system for monitoring shot peening which utilizes two-dimensional, hereinafter referred to as 2-D, line trace information. Exemplary of such a prior art system is U.S. Pat. No. 5,003,805 issued Apr. 2, 1991 to Thompson entitled "A Method and System for Monitoring Shot Peening" and assigned to the same assignee as the present invention. While this system has met with a degree of commercial success, the system is limited in that only a mere 2-D view of the surface treatment intensity is presented. Therefore, a further advantageous system, then, would be presented if a more complete analysis of the surface treatment could be presented.

It is apparent from the above that there exists a need in the art for a substrate surface treatment quality assurance system which will not destruct the substrate in order to complete the evaluation, but which will evaluate the surface treatment done on the substrate surface in a manner which provides a full and complete analysis of the surface treatment through the use of an automated analysis of digitally recorded topographical lines. It is a purpose of this invention to fulfill this and other needs in the art in a manner more apparent to the skilled artisan once given the following disclosure.

SUMMARY OF THE INVENTION

Generally speaking, this invention fulfills these needs by providing a method of quality assurance for a surface treatment operation on a substrate, a system user having predetermined a desired total plastic upset depth of said surface treatment and a desired amount of surface treatment data to be omitted, said method comprising the steps of: recording a wavelength of a predetermined area of said substrate which has been surface treated such that at least one line trace is recorded by a profilometer; filtering said line trace by a software filtering means to substantially eliminate said predetermined desired amount of surface treatment data to be omitted and to provide at least two relative maximums of data; determining coordinates of said relative maximums; recording said coordinates of said relative maximums; determining a spatial distance between said relative maximums; recording and/or displaying said spatial distance; determining an actual plastic upset depth; and adjusting, if needed, said surface treatment operation so that the actual plastic upset depth of a subsequently formed surface treated area should be more in conformance with said predetermined total plastic upset depth.

In certain preferred embodiments, the quality assurance method is performed in a manner that does not destruct the substrate. Also, the quality assurance method substantially avoids human operator indecision as to which line trace characteristics are representative of the impact dimple diameter.

The preferred surface treatment quality assurance system, according to this invention, offers the following advantages: excellent quality assurance characteristics; good stability; good durability; excellent reliability; and good economy. In fact, in many of the preferred embodiments, these factors of quality assurance characteristics and reliability are optimized to an extent considerably higher than heretofore achieved in prior, known surface treatment monitoring systems.

DETAILED DESCRIPTION OF THE INVENTION

Before discussing the specifics of a preferred embodiment of the present invention, it will be useful to discuss the physics of a surface treatment operation, preferably, a shot peening process. When a workpiece surface is subject to plastic deformation under the shot peening process, the beneficial effect of the process depends upon the shot particle energy. The energy depends upon the product of the particle mass and velocity squared.

Newton's second law of motion provides that force is equal to the change in the amount of motion, the amount of motion being mass (m) times velocity (v). The relationship may be stated as follows:

$$F = \frac{d}{dt}(mv) = m\frac{dv}{dt} + v\frac{dm}{dt}. \quad (1)$$

Typically, the above equation reduces to F=ma where a is acceleration. Acceleration is equal to the change in velocity over a period of time, and acceleration corresponds to the first term on the right side of Equation 1. In the case of a shot peening gun operating under steady state conditions, velocity does not change. Therefore, acceleration equals zero.

Accordingly, under steady state conditions, force (F) is equal to the velocity times the mass differential. The application of Equation 1 to a shot stream may be thought of as somewhat analogous to withdrawing a rope from a box by pulling the rope at a constant velocity. The first term of the equation is zero because the time differential of the velocity is zero. However, the second term of Equation 1 would be applicable in that the mass of the rope in the box is changing as the rope is pulled from the box.

In somewhat similar fashion, the change in the amount of motion of a stream of shot is its mass flow rate times its velocity. Thus, the velocity (v) of a stream of shot is equal to:

$$v = \frac{F}{R}, \quad (2)$$

wherein R is used to indicate the mass flow rate and corresponds to dm/dt, and v is the average velocity of the shot stream.

From Equation 2 above, it will be seen that the average velocity of the shot stream may be calculated if the mass flow rate (R) and the force (F) of the shot stream can be calculated. The system described in Thompson, U.S. Pat. No. 4,805,429, titled "Shot Peening System and Method With Velocity Sensing", which is assigned to the present assignee, senses F by sensing the reaction force of the shot peening gun. This reaction force is equal and opposite, in direction, from the force of the shot and gases which are expelled from the shot peening gun. A flow controller, usually disposed adjacent a shot hopper, provides mass flow rate (R).

Figure 1:
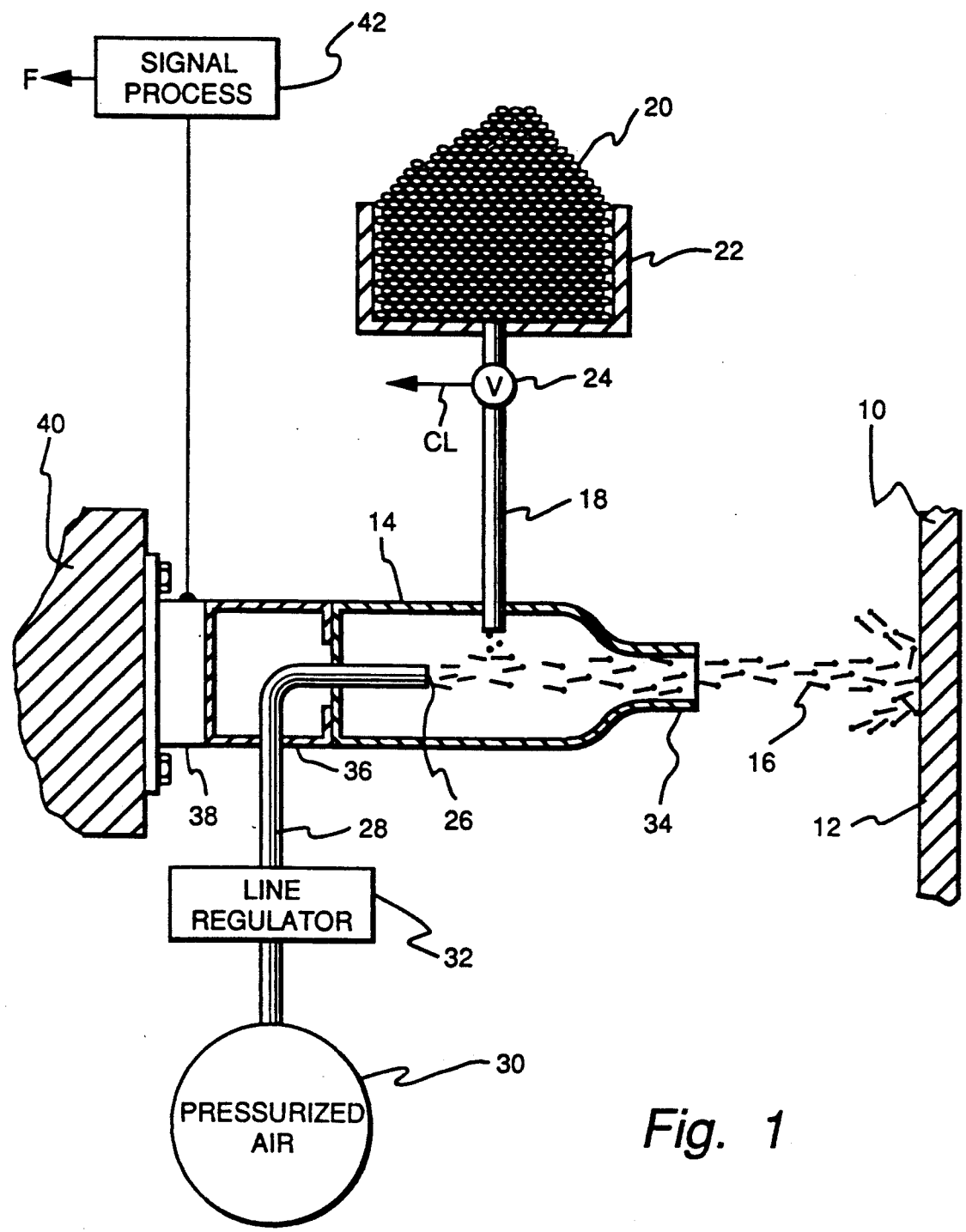
FIG. 1 shows a simplified schematic of a shot peening system.

FIG. 1 shows a shot peening operation. In particular, workpiece 10 has a surface 12 which is being subjected to shot peening from a shot peening gun 14. The shot peening gun 14 establishes a shot blast path 16 by expelling shot supplied to gun 14 through shot feedline 18 which carries shot 20 from hopper 22. The shot is supplied to feedline 18 by way of flow controller 24. The flow controller may be a common type of flow controller using an electromagnet to dispense metered amounts of metallic shot, although other types of flow controllers might be used. The flow controller 24 supplies a mass flow rate signal (R) in known fashion as shown through control line CL. Signal R represents the amount of shot which is supplied to the feedline 18 and, therefore, the amount of shot expelled by the gun 14 absent, for example, a blockage or other system malfunction.

The shot supplied to the gun 14 from feedline 18 is entrained in pressurized air from an air expansion nozzle 26 at the end of air supply conduit 28. The air supply conduit 28 provides pressurized air from pressured air source 30 by way of line regulator 32, which is used in known fashion to regulate and adjust the air pressure supplied to the gun 14. The pressure of the air supplied to the nozzle 26, among other factors, helps to determine the velocity of the shot expelled from the nozzle 34 and gun 14. The gun 14 is mounted to a bracket 36.

The components of FIG. 1 which are discussed above are relatively standard components. Shot peening gun 14 is a gravity type of shot peening gun. Other types of shot peening guns such as a suction lift gun or pressure pot gun may also be utilized.

In order to obtain the force magnitude data specified by Equation 2, gun 14 includes a bracket 36 which is mounted upon a force sensor 38. The force sensor 38 is disposed between the gun 14 and mounting base 40 which supports the gun 14. The force sensor 38 is preferably a directional strain gauge which should detect forces parallel to the direction in which shot is ejected from gun 14. However, the force sensor 38 should also detect the reaction force of the gun 14 as it ejects the shot in path 16. The force sensor 38 is connected to signal processing circuit 42 which supplies the force signal (F). Although other force sensors could be used, the force sensor 38 may be a commercially available Lebow load cell Model 3397 and the signal processing circuit 42 may be a corresponding commercially available transducer instrument 7530, these two components typically being sold as a package. The signal processing circuit 42 basically converts the output from force sensor 38 into a form corresponding to pounds of force such that the output may be displayed and/or recorded.

As should be apparent from the above discussion, the velocity of a shot stream can be adjusted by adjusting the force at which the shot is expelled. The force at which the shot is expelled may be adjusted, for example, by decreasing or increasing the flow of air into the gun from pressured air source 30. Also, for example, line regulator 32 may be utilized to achieve the force adjustment. The mass flow rate may be adjusted, for example, by adjusting the rate at which shot is expelled from hopper 22. Flow controller 24 may be utilized, for example, to make the mass flow rate adjustment.

Figure 2:
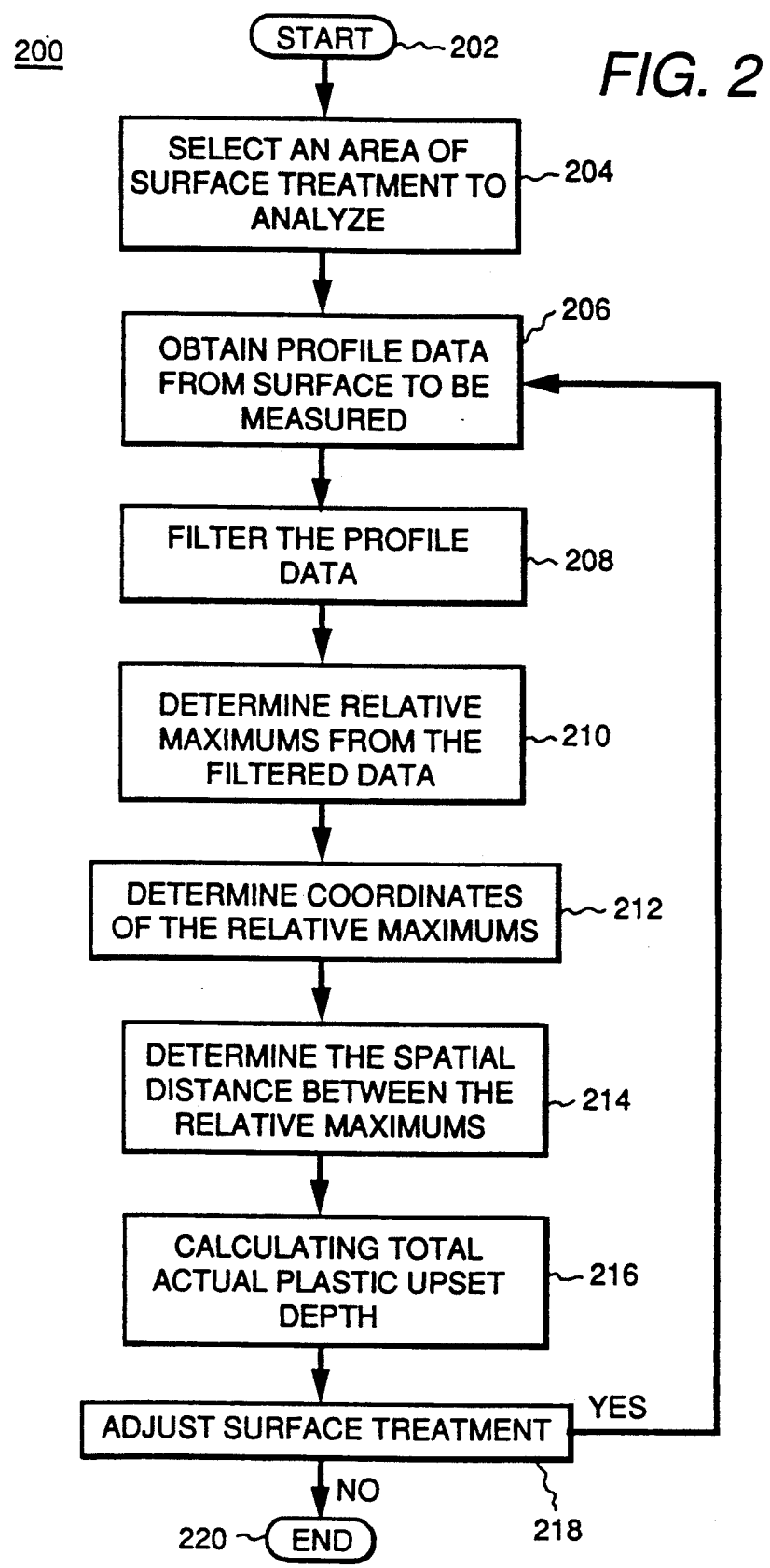
FIG. 2 is a flowchart illustrating a sequence of method steps in accordance with the present invention.

To perform quality assurance of a shot peening operation, and in accordance with the present invention, after a workpiece surface has been peened, a system user initiates the process which is briefly illustrated as a flow diagram 200 in FIG. 2. The system user may, for example, be a human or a computer including a computer-controlled robotic unit. Specifically referring to flowchart 200, after the process has been initiated as indicated at a start block 202, the system user selects an area of the substrate which has been surface treated as indicated at block 204. Next, a profile of the workpiece surface to be measured is obtained as indicated at block 206. The profile may be obtained by using a profilometer such as a commercially available profilometer known as a Taylor Hopson "Form Talysurf", available from Rank Taylor Hobson, Limited (British Company). Other profilometers with suitable sensitivity, for example optical profilometers could provide the necessary profile data. After the profile data is obtained, the data is filtered by a software filter as indicated in block 208. Relative maximums of the filtered data are determined as indicated in block 210. The coordinates of these relative maximums are determined as indicated in block 212. The spatial distance between the relative maximum is determined as indicated in block 214. The total actual plastic upset depth is calculated as indicated in block 216. The surface treatment operation is adjusted, if needed, as indicated in block 218.

Figure 3:
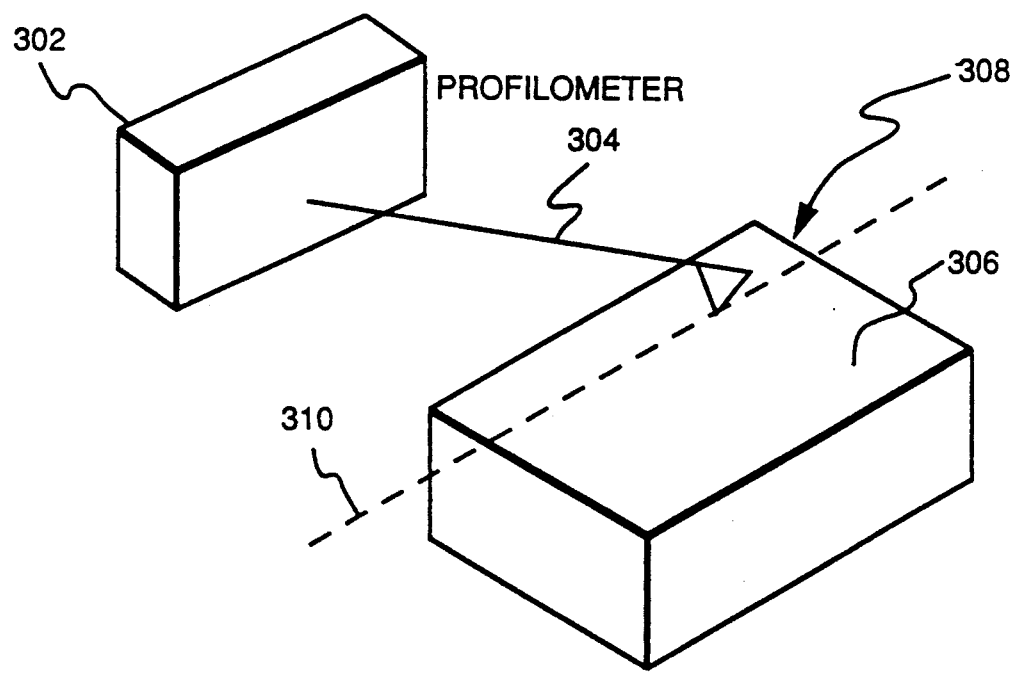
FIG. 3 illustrates, in block diagram, a profilometer operating to gather profile data from a workpiece.

With respect to FIG. 3, a profilometer 302 including a stylus 304 is shown as operating to gather profile data from a surface 306 of a workpiece 308. The stylus and/or workpiece is moved so that the stylus remains in contact with surface 306 along a selected dimension such as along a line 310. As the stylus moves along surface 306 on line 310, it records information regarding the surface geometry as a topogram plot.

Figure 4:
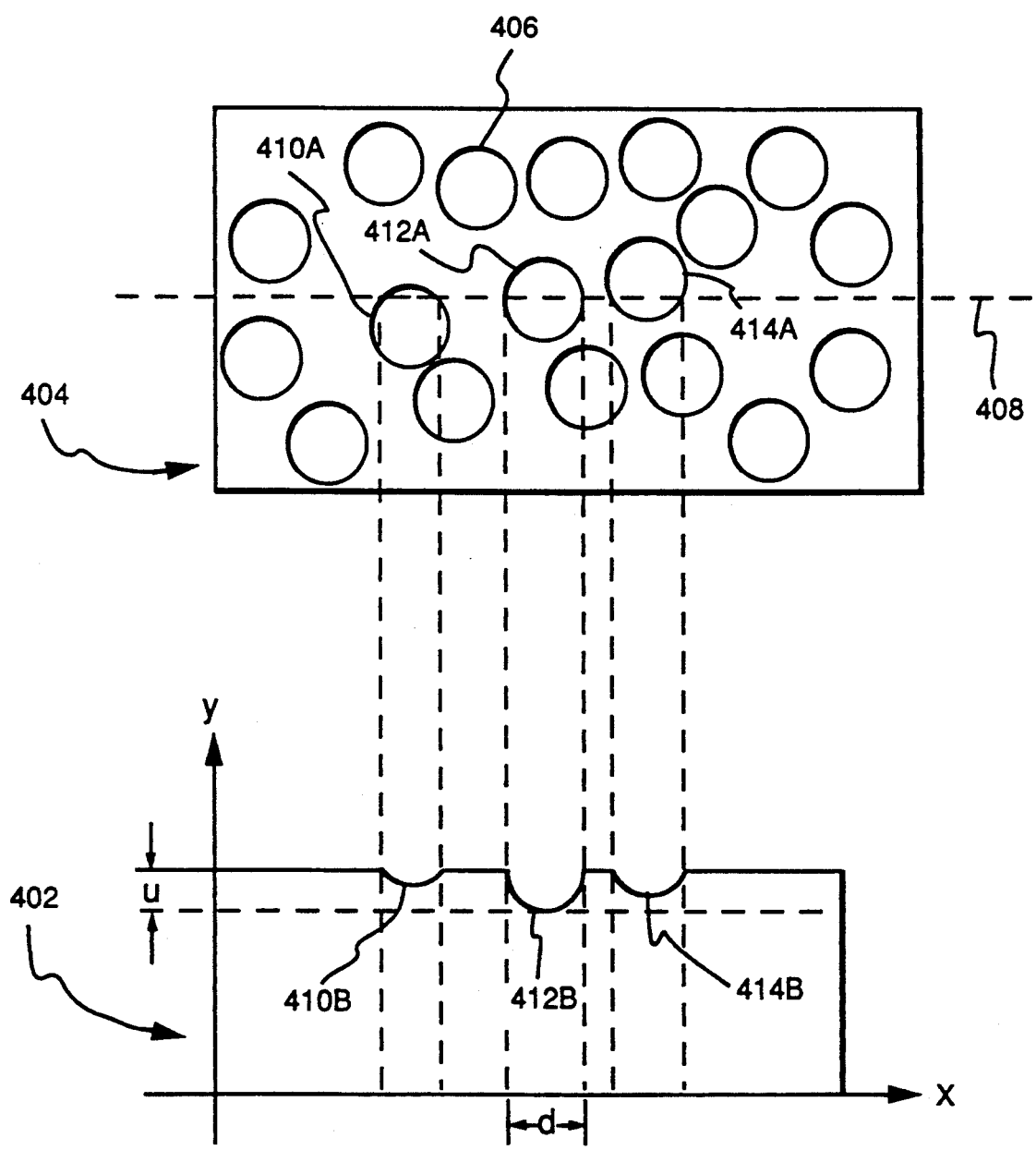
FIG. 4 illustrates a peened surface and corresponding ideal profile data which would be obtained from the surface.
Figure 5:
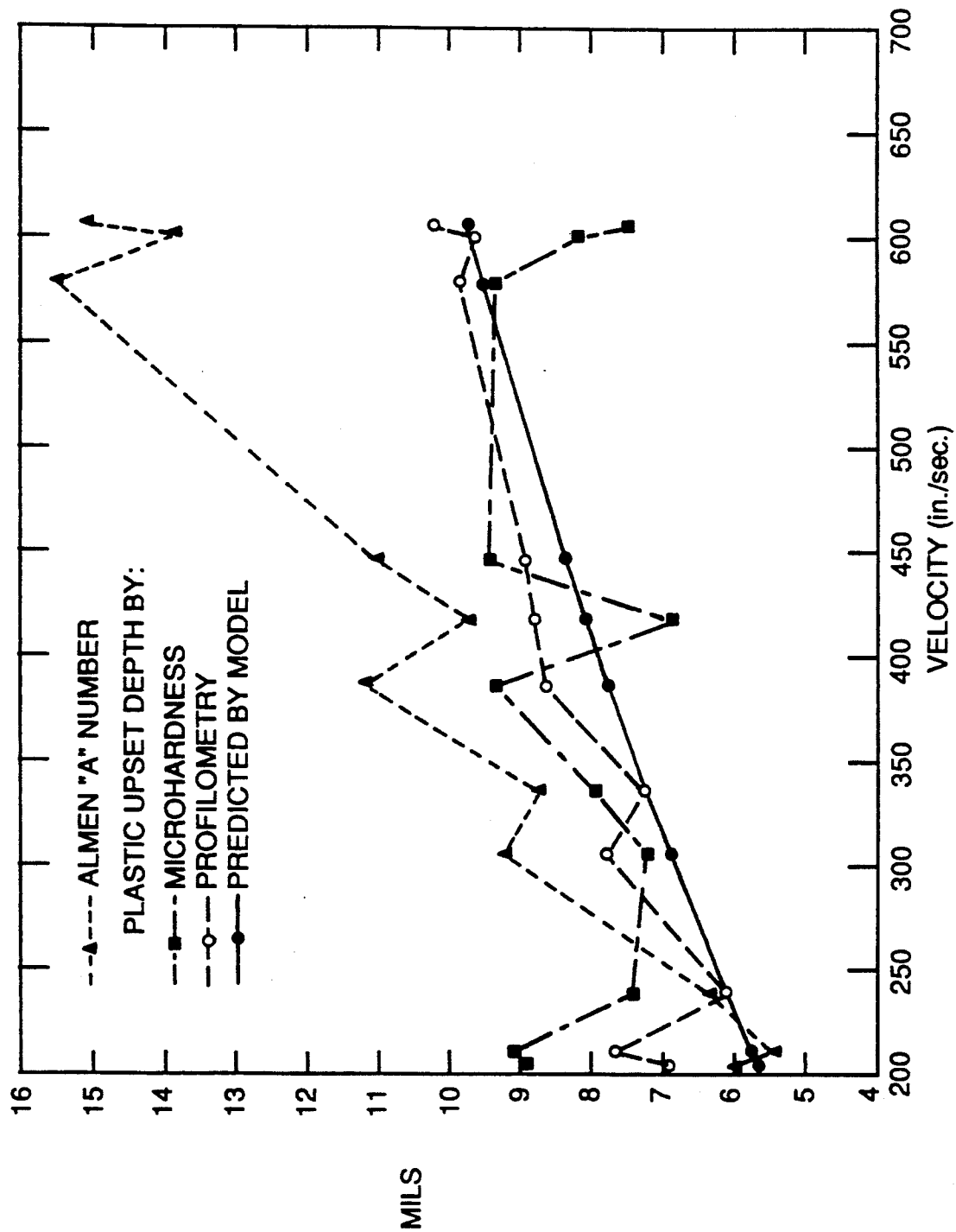
FIGS. 5-10 illustrates profilometry results for the various types of surface treatment quality assurance systems.
Figure 6:
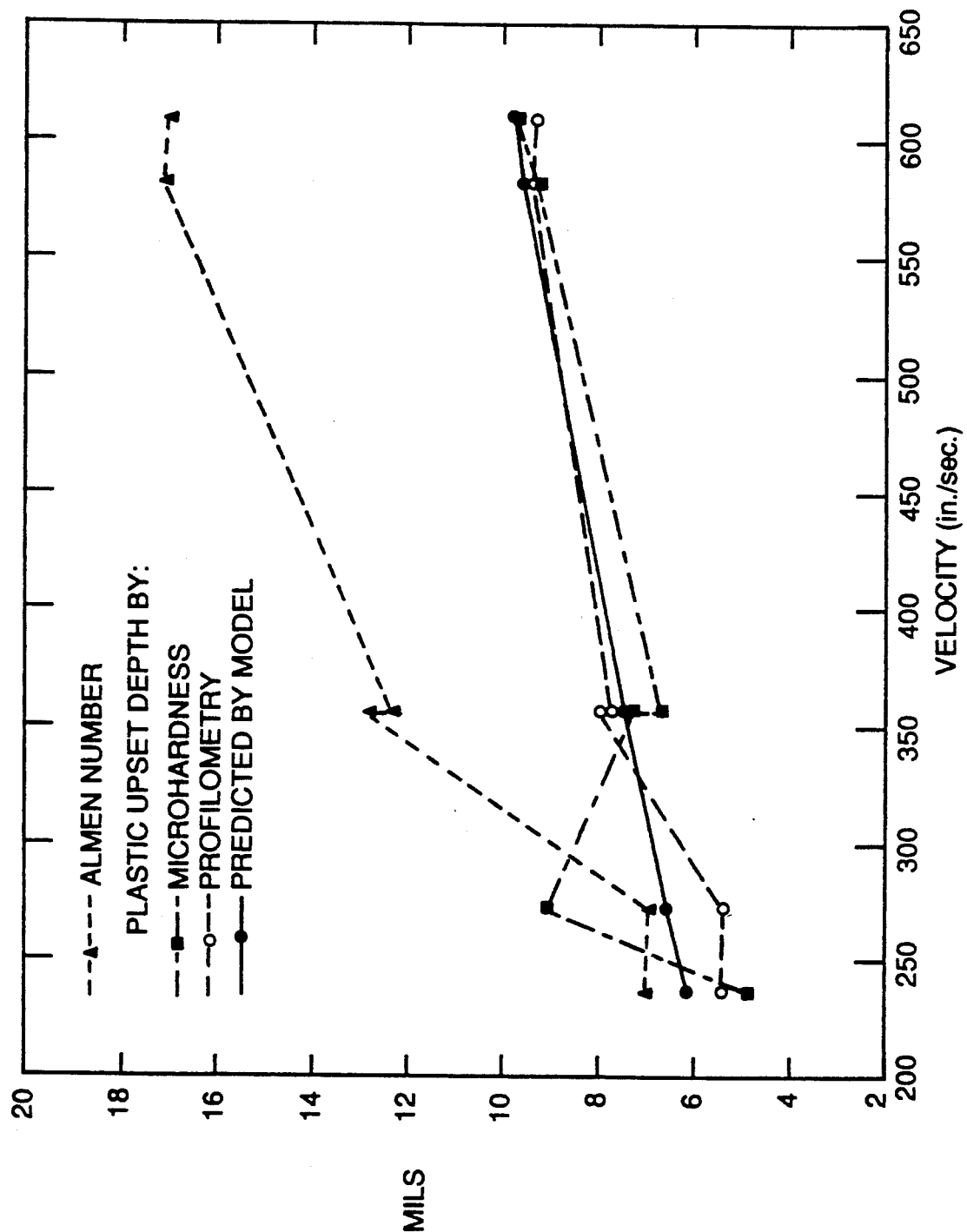
Figure 7:
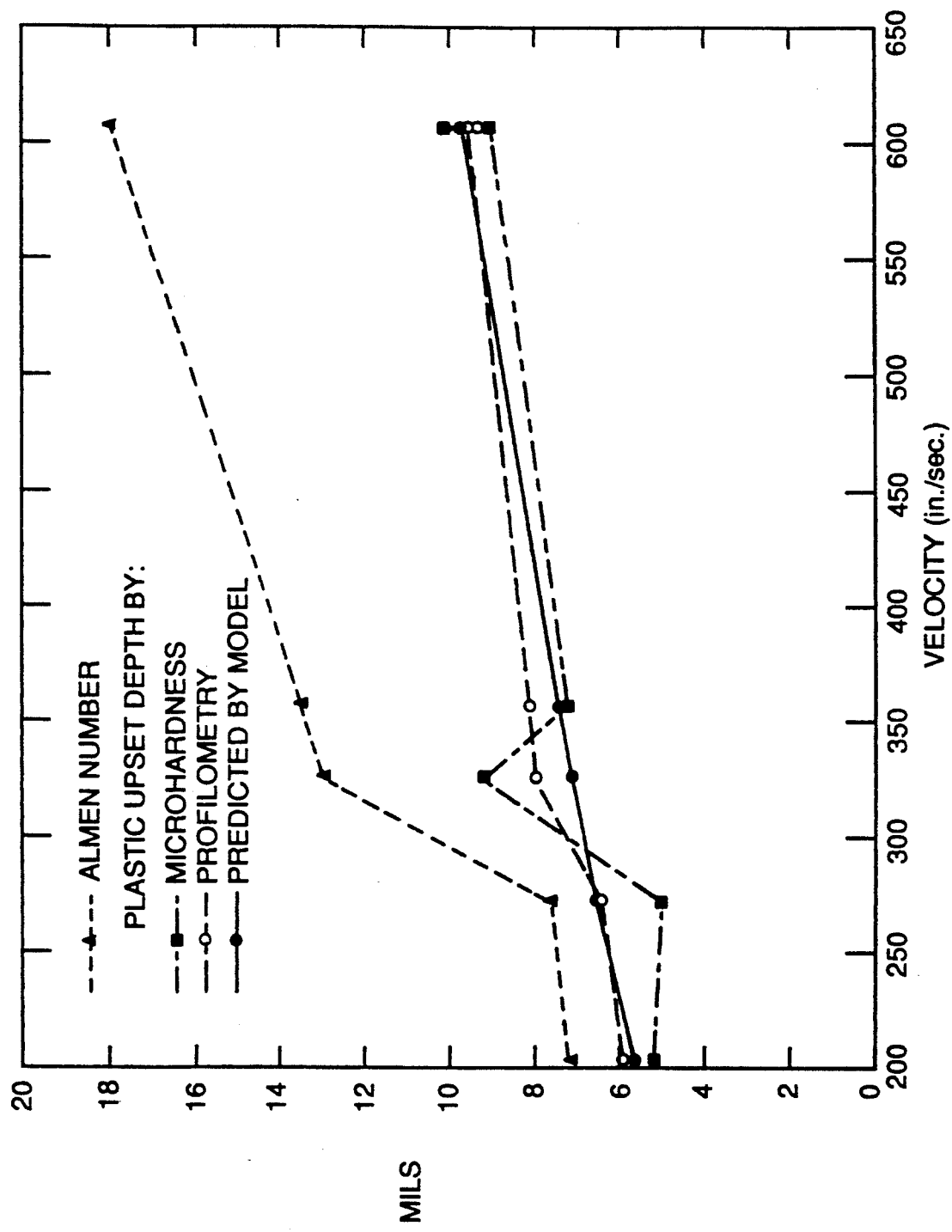
Figure 8:
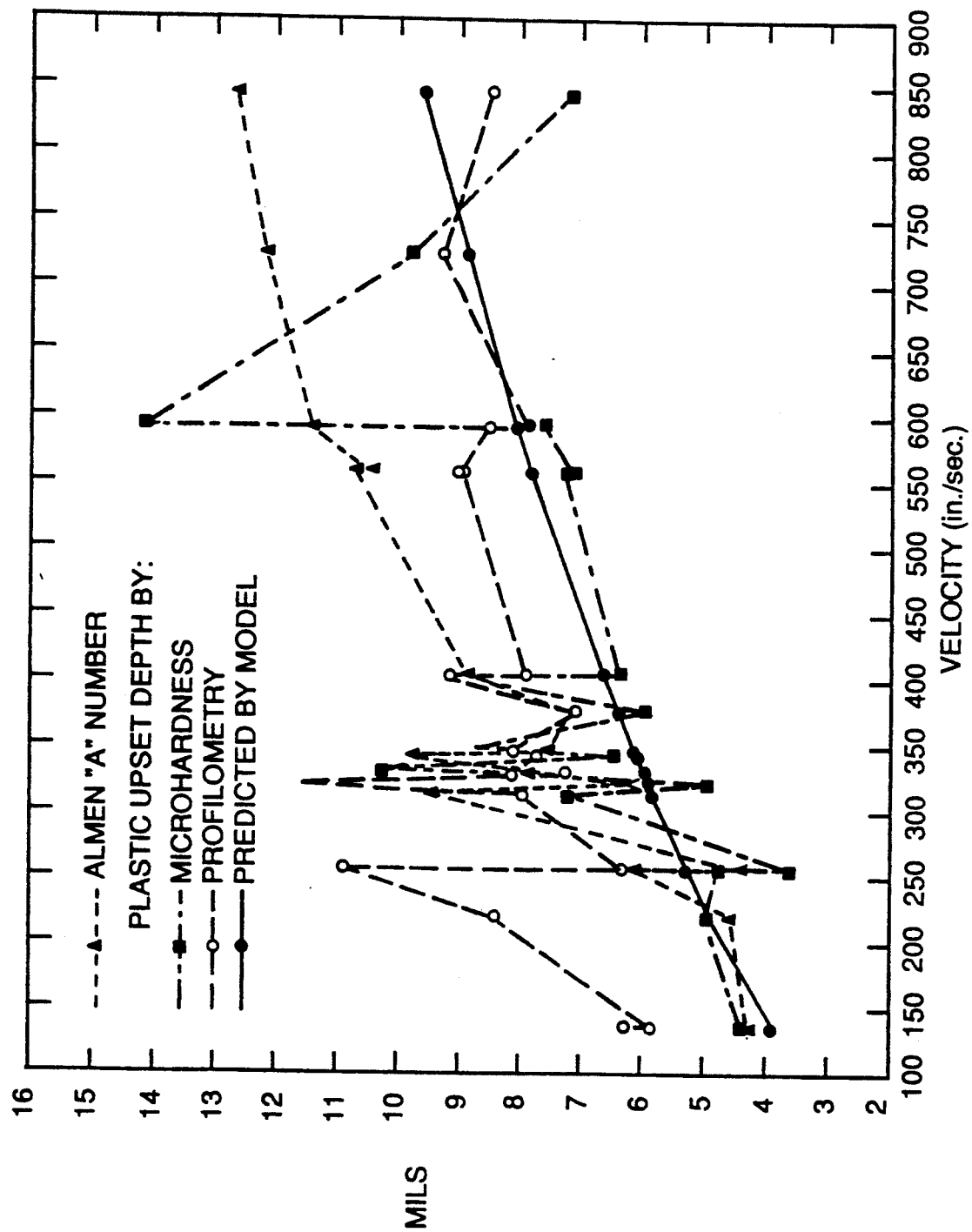
Figure 9:
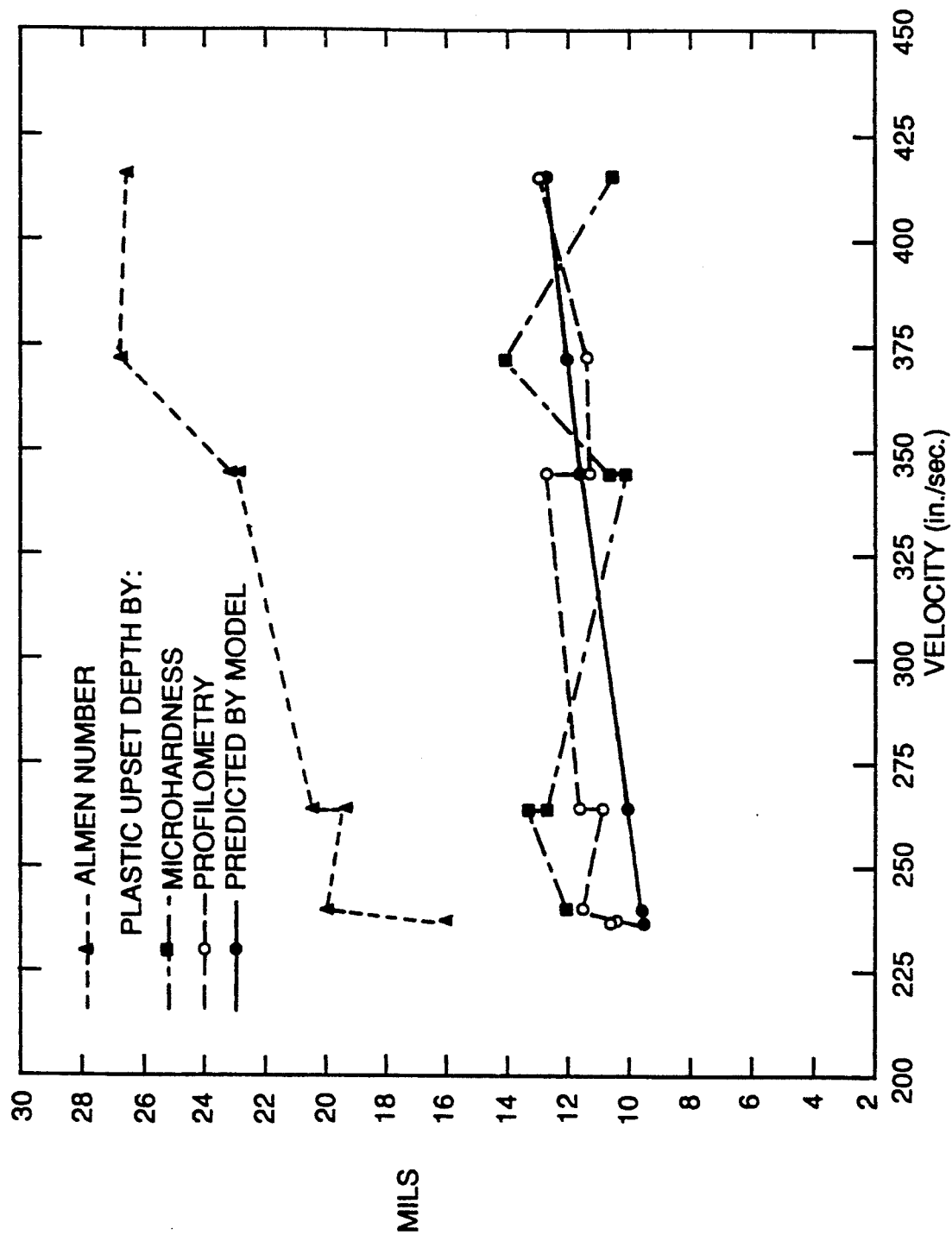
Figure 10:
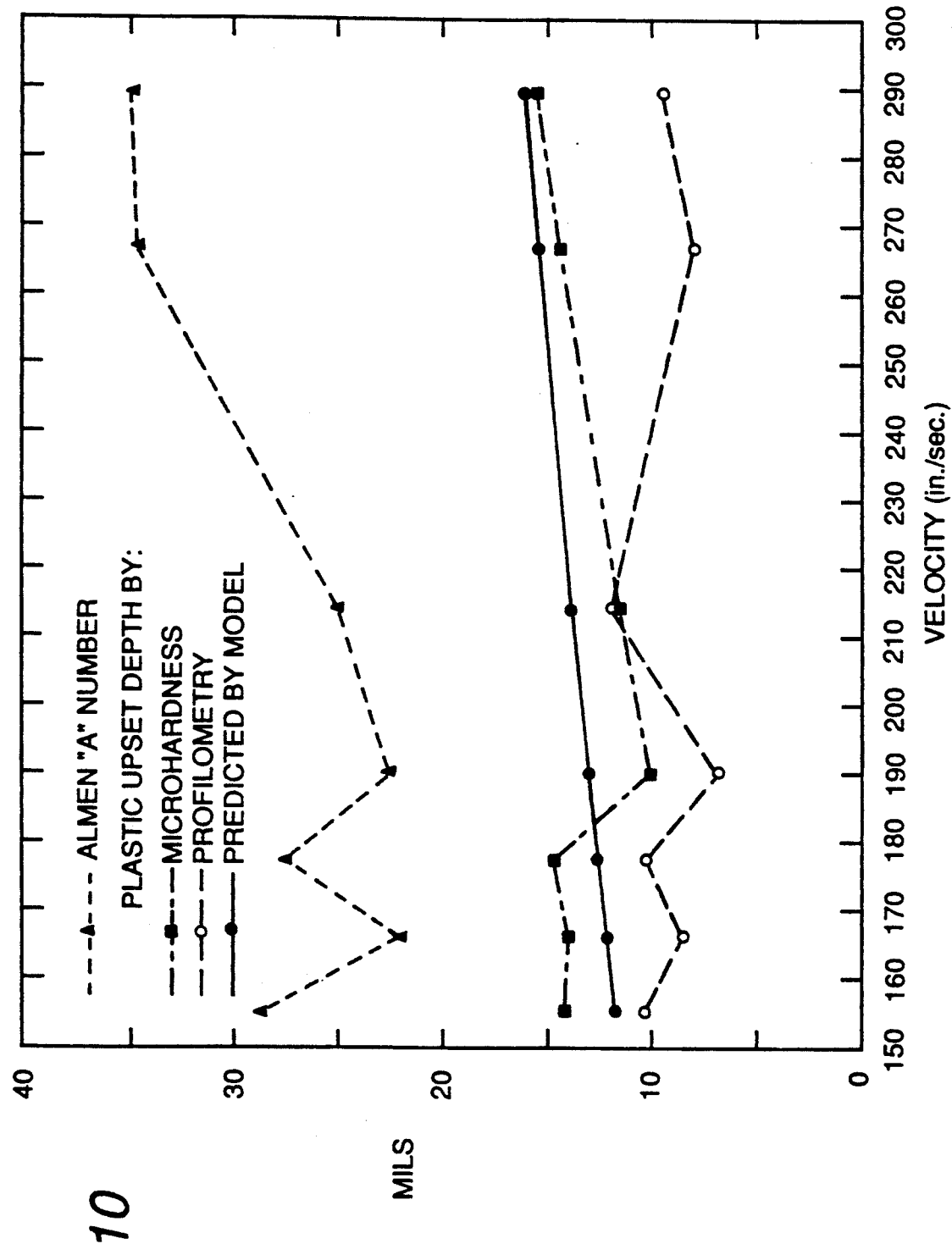

An example of an ideal topogram plot 402 is shown in FIG. 4. The example shown in FIG. 4 is for illustrative purposes only, and normally, the entire surface of a workpiece would be peened until 100% of the surface has been struck, at least once, by a shot. Specifically referring again to FIG. 4, a workpiece 404 including a peened surface 406 is represented in topogram plot 402. The ideal profile data represented in topogram plot 402 is the data which would ideally be obtained by moving the stylus of the profilometer across the workpiece surface and along a line 408. As is apparent from FIG. 4, the stylus will not necessarily move through the center of each dent, and therefore, the data obtained for each dent will not be uniform. For example, for dent 410A, the stylus moves across only a small portion of the dent, and therefore, a corresponding curve 410B in the profile data only represents a portion of dent 410A. For dent 412A, however, the stylus moves through the center of the dent. A curve 412B represented in the profile data, therefore, represents a full diameter (d) and a full peak-to-valley depth (u) of dent 412A. As with dent 410A, only a portion of a dent 414A is represented as a curve 414B in the profile data.

The present invention attempts to utilize a software application which involves directly recording the wavelength of each peened induced surface feature. More specifically in FIG. 4, raw line trace 408 as recorded by profilometer 302 produces maximum peaks. These maximum peaks are low pass filtered by a conventional low pass, software filter to eliminate, preferably, high frequency surface noise, the cutoff frequency being, preferably, 500 cycles/inch. Next, the coordinates of each relative maximum of the filtered line trace are found and recorded by a conventional computer using conventional techniques. The spatial distance (abcissa) between the maxima is then determined and recorded using conventional techniques. In this way, the long wave effects, such as, for example, machining marks are disregarded and only the finer, random surface structure due to surface treatment is retained.

Figure 12:
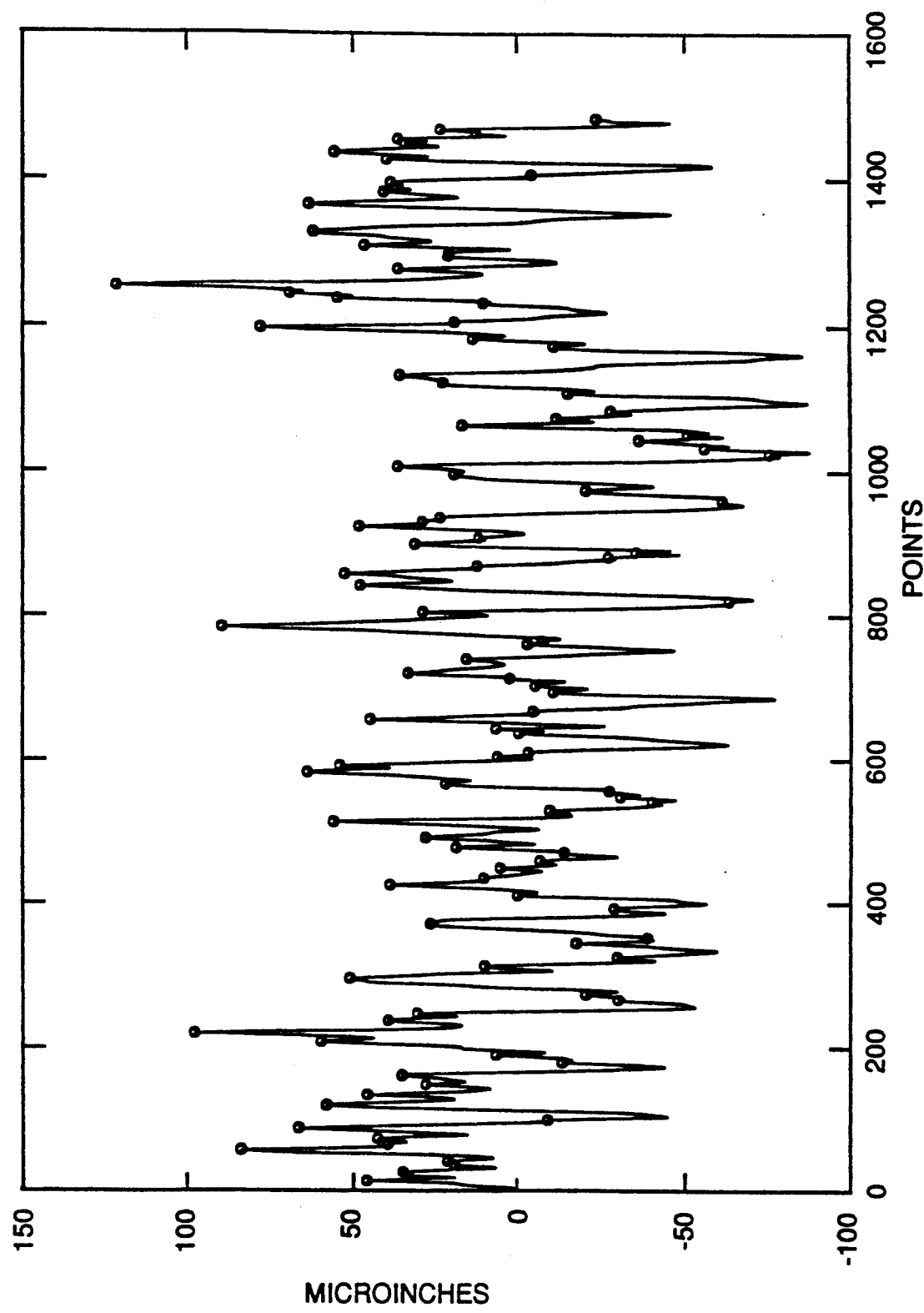
FIG. 12 illustrates a low pass filtered line trace with computer generated data at each relative maximum.
Figure 13:
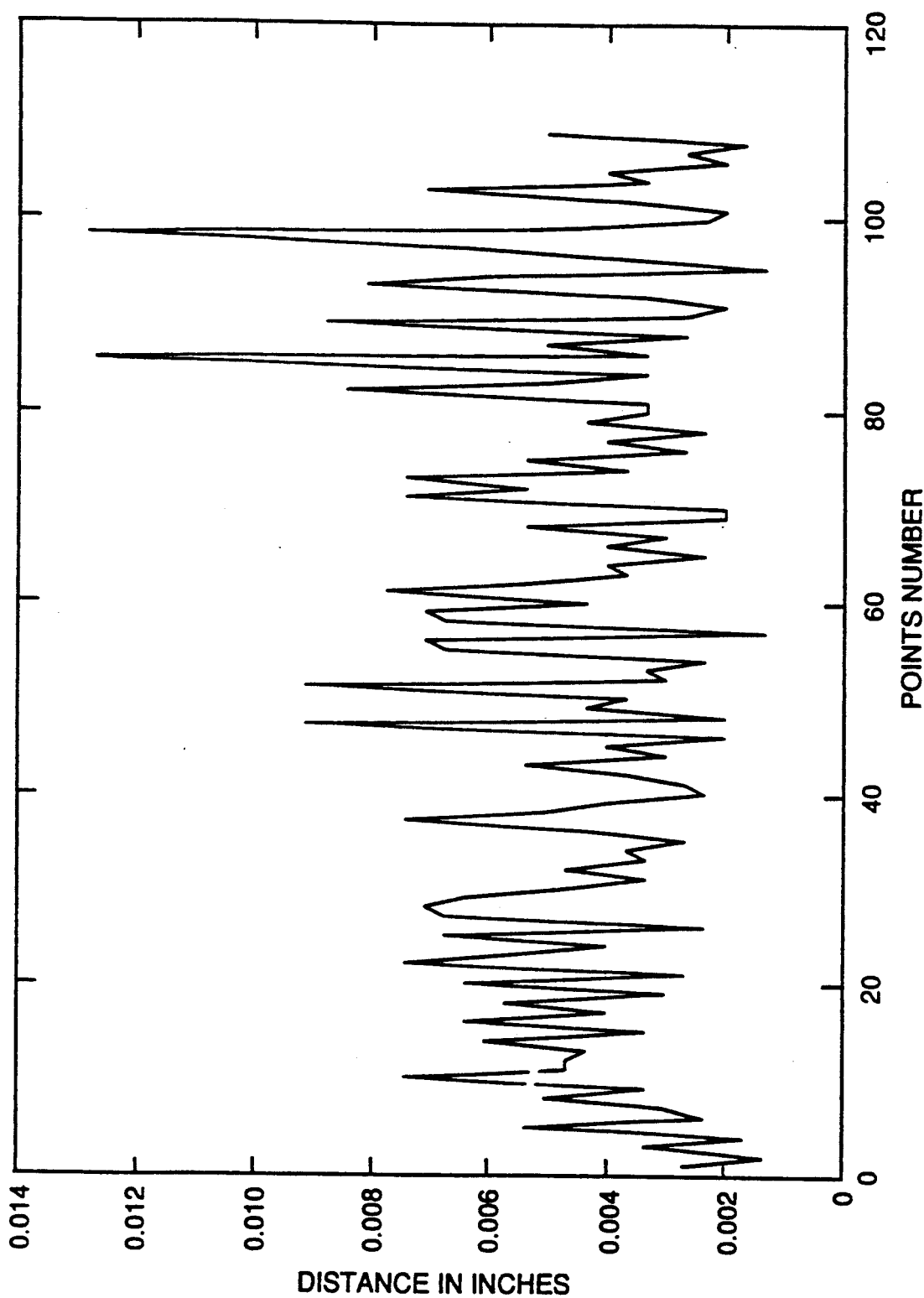
FIG. 13 illustrates the spacing between each relative maximum or the wavelength of each surface treatment dimple.
Figure 14:
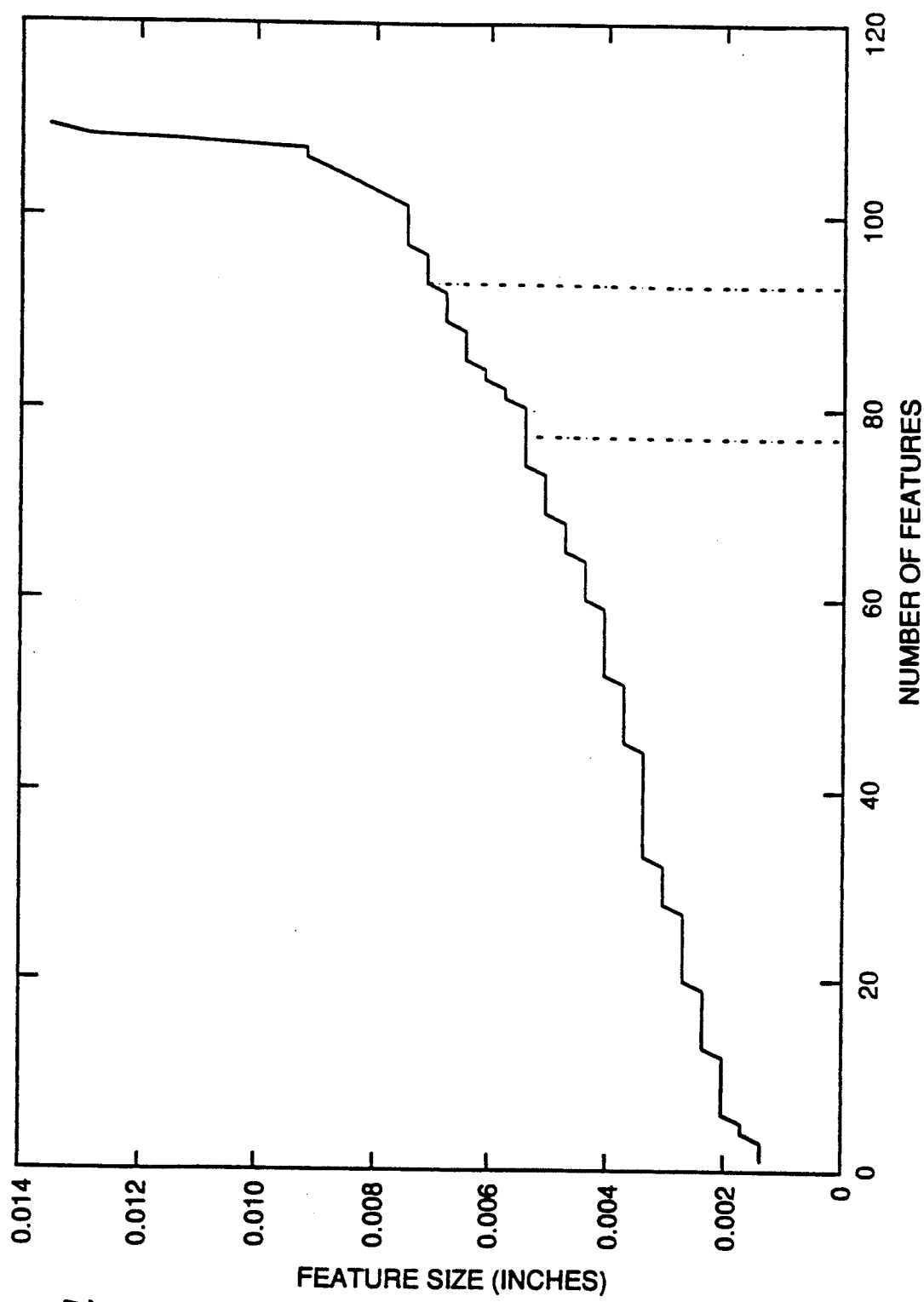
FIG. 14 illustrates the distribution of features or surface treatment dimples as depicted in FIG. 13, starting with the smallest feature.

FIGS. 12–14 for the sample (Almen intensity 7.6 A) illustrate the way the analysis functions. FIG. 12 shows a low pass filtered line trace with its fine structure due to shot peening dimples riding on top of the longer waves associated with machining marks and still longer waves due to some other unknown effect. FIG. 12 also shows computer generated dots at each relative maximum, these dots being generated in the computer by conventional techniques. Closer examination of this figure will show an average abcissa spacing between the dots, typically, of about 20 counts or 20 counts $\times$ 0.00033 inches/count = 0.0067 inches (remember a line trace is, typically, 0.500 inches long and consists of 1500 data points or counts). A plastic upset depth of 0.0067 inches corresponds nicely with an Almen intensity for the sample of 7.6 A.

As shown in FIG. 12 there are, typically, about 5 dots to a relative maxima for each next largest surface feature, in this case tool feed marks. Since only the spacing between the dots themselves is captured, the longer wave effects are automatically filtered out. Only in cases, for example, where the smaller features are not picked up will the machining mark information get through. This can occur, for example, if there is a lack of coverage or if the features are so small they do not pass the 500 waves/inch low pass filter.

Next, FIG. 13 shows the spacing, in inches, between each relative maxima, or the wavelength of each peening dimple which was calculated and recorded using conventional techniques. That is, the abcissa of FIG. 13, typically, indicates dot number, starting with the first dot at the left of FIG. 12 while the ordinate, typically, is the spacing between that dot and its neighbor to the right in inches. Finally, FIG. 14 sorts the features or peening dimples illustrated in FIG. 13 by size, starting with the smallest feature through the use of conventional statistical techniques. It gives the number of features of a given size as length on the abcissa and the size of the feature itself on the ordinate. The total number of points on the abcissa should equal the number of relative maxima or dots found on the filtered line trace (FIG. 12). For example, if there were 10 features, 0.005 inches in size, a horizontal line 10 abcissa counts long would appear at the 0.005 inch ordinate.

Now, by noting FIG. 4, the interpretation of the results illustrated by FIG. 14 should become clear. If the line trace passes through a diameter of a shot induced dimple, for example 412A, the measured wavelength will be longer than if it passes along the cord of a dimple, for example, 410A. Similarly, dimples that have been partially obliterated by subsequent strikes will show a shorter wavelength. Thus, the largest features detected by the analysis is indicative of dimple diameter. Since the plastic upset depth (which is the goal of the measurement) is roughly equal to the dimple diameter, the longest waves, are therefore representative of plastic upset depth. The results shown in FIGS. 5 through 10 are the average of the wavelength population between 70 and 85 percent of maximum. The longest 15% were eliminated, typically, to eliminate long wave noise which may allow the tool feed lines to pass (as described above). The shorter waves between 0% and 70% were eliminated, typically, for reasons just enumerated.

Once the actual plastic upset depth of the substrate surface has been determined, the system user can, if needed, adjust the system so that subsequently treated substrate surfaces should be more in conformance with the desired predetermined plastic upset depth.

Figure 11:
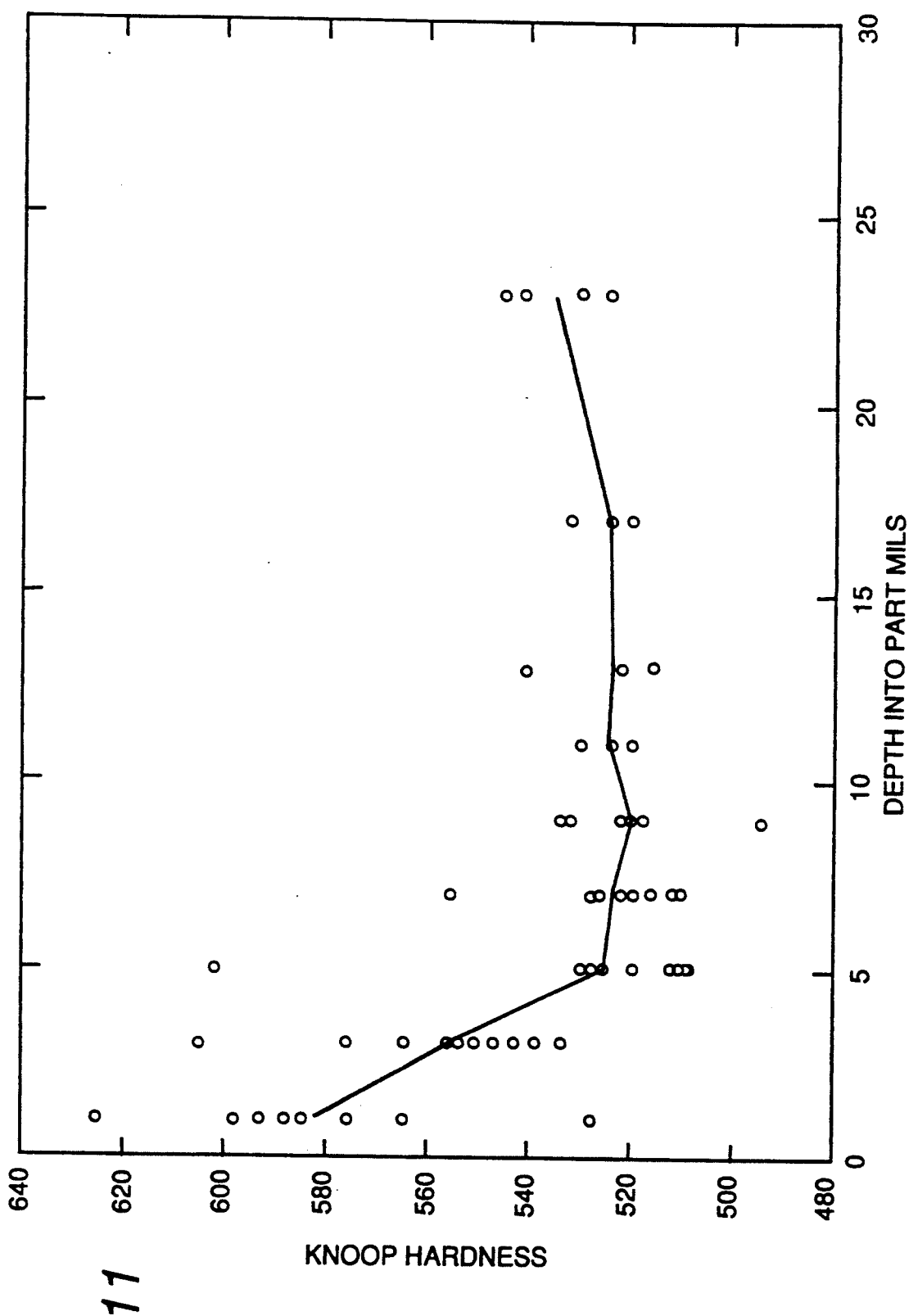
FIG. 11 illustrates a microhardness quality assurance technique measurement of plastic upset depth using a knoop indenter.

With respect to FIGS. 5-11, these figures show that the actual plastic upset depth predicted by the present invention is in good agreement with the actual value measured by the microhardness technique. In particular, the dots along each microhardness curve correspond to specific test values. The microhardness drops were made using a conventional knoop indenter, preferably, with a 100 gram load. Several drops were made for each test condition and the results for each drop average to give a hardness vs depth's curve as illustrated in FIG. 11. The plastic upset depth was chosen, typically, as the knee of the microhardness curve.

For a given shot and workpiece combination the plastic upset depth as predicted by the model varies linearly with shot diameter and as the square root of its velocity. Therefore, the model curves of FIGS. 5 through 10 are continuous functions of velocity and have a factor based on shot diameter.

The high resolution profilometry prediction of plastic upset depth shows good agreement with the microhardness and predicted results. With the exception of a shot impact angle of 45° (FIG. 8) and 3/32" diameter shot (FIG. 10), the results are very gratifying when one considers the broad range of test conditions and that the data analysis procedure was identical for each condition. The 45° results may be explainable, for example, in terms of the elongated dimples due to the glancing shot blow. The discrepancy in the 3/32 results occurs, typically, at inordinately high Almen numbers.

From the foregoing discussion, it should be apparent that the present method and system provide that the results from a shot peening operation can be determined in a direct and non-destructive manner, and that the quality assurance of the shot peening results can be continuously monitored therefore eliminating insensitivity due to process changes. The present invention also provides that accurate results may be obtained for flat as well as contoured surfaces. Importantly, the present invention provides that the results of shot peening operations may be improved by facilitating more accurate control of the peening operations.

Once given the above disclosure, many other features, modifications and improvements will become apparent to the skilled artisan. Such features, modifications and improvements are, therefore, considered to be a part of this invention, the scope of which is to be determined by the following claims.

What is claimed is:

1. A method of quality assurance for a surface treatment operation on a substrate, a system user having predetermined a desired total plastic upset depth of said surface treatment and a predetermined desired amount of surface treatment data to be omitted, said method comprising the steps of:

recording a wavelength of predetermined area of said substrate which has been surface treated such that at least one line trace is recorded by a profilometer;

filtering said line trace by a software filtering means to substantially eliminate said predetermined desired amount of surface treatment data to be omitted and to produce at least two relative maximums of data;

determining coordinates of said relative maximums;

recording said coordinates of said relative maximums;

determining a spatial distance between said relative maximums;

recording and/or displaying said spatial distance;

determining an actual plastic upset depth; and adjusting, if needed, said surface treatment operation so that the actual plastic upset depth of a subsequently formed surface treated area should be more in conformance with said predetermined total plastic upset depth.

2. The method of quality assurance for a surface treatment operation on a substrate, according to claim 1, wherein said surface treatment is further comprised of the step of shot peening said surface of said substrate.

3. The method of quality assurance for a surface treatment operation, according to claim 1, wherein said recording is further comprised of the step of:

directly recording said wavelength by means of an electromechanical profilometer means.

4. The method of quality assurance for a surface treatment, according to claim 1, wherein said recording is further comprised of the step of:

directly recording said wavelength by means of an optical profilometer means.

5. The method of quality assurance for a surface treatment operation, according to claim 1, wherein said filtering is further comprised of the step of:

filtering said line trace with low pass, software filter means.

* * * * *